US006950591B2

(12) United States Patent
Schroeder et al.

(10) Patent No.: US 6,950,591 B2
(45) Date of Patent: Sep. 27, 2005

(54) LASER-WRITTEN CLADDING FOR WAVEGUIDE FORMATIONS IN GLASS

(75) Inventors: Joseph F. Schroeder, Lindley, NY (US); Alexander Streltsov, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 164 days.

(21) Appl. No.: 10/147,698

(22) Filed: May 16, 2002

(65) Prior Publication Data

US 2003/0215204 A1 Nov. 20, 2003

(51) Int. Cl.[7] ................................................. G02B 6/10
(52) U.S. Cl. ...................................... 385/132; 385/129
(58) Field of Search .............................. 385/132, 129, 385/131, 123, 124

(56) References Cited

U.S. PATENT DOCUMENTS

| | | |
|---|---|---|
| 4,270,130 A | 5/1981 | Houle et al. |
| 4,641,924 A | 2/1987 | Nagae et al. |
| 4,847,138 A | 7/1989 | Boylan et al. |
| 5,157,674 A | 10/1992 | Lawandy |
| 5,178,978 A | 1/1993 | Zanoni et al. |
| 5,253,198 A | 10/1993 | Birge et al. |
| 5,285,517 A | 2/1994 | Wu |
| 5,289,407 A | 2/1994 | Strickler et al. |
| 5,325,324 A | 6/1994 | Rentzepis et al. |
| 5,616,159 A | 4/1997 | Araujo et al. |
| 5,627,933 A | 5/1997 | Ito et al. |
| 5,656,186 A | 8/1997 | Mourou et al. |
| 5,675,691 A | 10/1997 | Edlinger et al. |
| 5,761,111 A | 6/1998 | Glezer |
| 5,773,486 A | 6/1998 | Chandross et al. |
| 5,841,928 A | 11/1998 | Maxwell et al. |
| 5,896,484 A * | 4/1999 | Borrelli et al. ............. 385/132 |
| 5,919,607 A | 7/1999 | Lawandy |
| 6,075,625 A | 6/2000 | Ainslie et al. |
| 2001/0007606 A1 * | 7/2001 | Sasaki et al. ............... 385/129 |
| 2001/0021293 A1 * | 9/2001 | Kouta et al. ................ 385/123 |
| 2002/0021883 A1 * | 2/2002 | Koyano et al. ............. 385/143 |
| 2003/0026571 A1 * | 2/2003 | Bazylenko ................... 385/129 |
| 2003/0077060 A1 * | 4/2003 | Chen et al. ................. 385/129 |
| 2004/0047580 A1 * | 3/2004 | Shimada et al. ............ 385/132 |

FOREIGN PATENT DOCUMENTS

| | | |
|---|---|---|
| EP | 0 569 182 | 12/1997 |
| JP | 6-308343 A * | 11/1994 |
| JP | 6-331843 A * | 12/1994 |
| JP | 9-5808 A * | 1/1997 |
| JP | 11-255536 | 9/1999 |
| WO | 93/16403 | 8/1993 |
| WO | 97/32821 | 9/1997 |
| WO | 01/44871 | 7/2000 |
| WO | 01/23923 | 9/2000 |
| WO | 01/09899 | 2/2001 |

OTHER PUBLICATIONS

Kondo, Y et al., Three–dimensional microscopic crystallization in photosensitive glass by femtosecond laser pulses at nonresonant wavelength, Japanese Journal of Applied Physics, Part 2, vol. 37, no 1A–B, Jan. 1998.

George H. Beall, Industrial Applications of Silica, Reviews in Mineralogy, vol. 29, pp. 469–505, 1994, no month.

K. Hirao et al., Writing Waveguides in Silica–related Glasses with Femtosecond Laser, Technical Digest, Jul. 1997, pp. 103–105.

(Continued)

*Primary Examiner*—Jared J. Fureman
(74) *Attorney, Agent, or Firm*—Gregory V. Bean

(57) ABSTRACT

High-energy pulses of femtosecond lasers form cladding portions of waveguides in bulk glass by producing localized reductions in refractive index. The cladding portions written by the high-energy pulses circumscribe unexposed core portions for defining light-guiding pathways in the bulk glass.

12 Claims, 4 Drawing Sheets

OTHER PUBLICATIONS

N.F. Borrelli et al., Densification of fused silica under 193–nm excitation, J. Opt. Soc. Am. B/vol. 14, No. 7, Jul. 1997, pp. 1606–1615.

K. Hirao, K. Miura, Writing waveguides and gratings in silica and related materials by a femtosecond laser, Journal of Non–Crystalline Solids 239 (1998), pp. 91–95, no month.

Yuki Kondo et al., Fabrication of long–period fiber gratings by focused irradiation of infrared femtosecond laser pulses, Optics Letters/vol. 24, No. 10, May 15, 1999, pp. 646–648.

K. M. Davis et al., Writing waveguides in glass with a femtosecond laser, Optics Lettersvol. 21, No. 21, Nov. 1, 1996, pp. 1729–1731.

N. F. Borrelli et al., Excimer–laser–induced densification in binary silica glasses, Optics Letters/vol. 24, No. 20, Oct. 15, 1999, pp. 25–27.

K. Miura et al.Photowritten optical waveguides in various glasses with ultrashort pulse laser, Appl. Phys. Lett. 71 (23), Dec. 8, 1997, pp. 3329–3331.

Akira Nakajima, Science & Technology, Glass emerges as data–storage contender, High–pulse laser, hole–burning technique combine to give small cube potential capacity of thousands of DVDs, no date available.

Corning Incorporated, May 1999, HPFS® Standard Grade, www.hpfs.corning.com.

Corning Incorporated, May 1999, HPFS® ArF Grade, ww.hpfs.corning.com.

Corning Incorporated, May 1999, HPFS® KrF Grade, www.hpfs.corning.com.

CYMER—Products: 193 nm ArF Product Family, Sep. 21, 2000, http://www.cymer.com/Products/arf products.html, pp. 1–2.

CYMER—Products: 248 nm KrF Product Family, Sep. 21, 2000, http://www.cymer.com/Products/karf products.html, pp. 1–2.

CYMER—Products: Background, Sep. 21, 2000, http://www.cymer.com/Products/background.html, pp. 1–2.

Coherent—Products—Lasers—Ion—Innova FreD, Innova FRED Lasers, http://www.coherentinc.com/cohhrLasersION/html/fred.html, Sep. 21, 2000, pp. 1–2.

Coherent—Laser Applications—Lithography, http://www.coherentinc.com/cohhrLasersAPPLICATIONS/html/lithography.html, Sep. 21, 2000, pp. 1–2.

Coherent, Frequency–Doubled Ion Laser System, 1996, pp. 1–2, no month.

Positive Light, http://www.poslight.com, Sep. 21, 2000.

Positive Light, Indigo—SLM, preliminary data sheet, Oct. 1999, pp. 1–2.

Positive Light, Indigo—DUV, May 2000, pp. 1–2.

Positive Light, Custom Lasers, Oct. 1999, pp. 1–2.

Positive Light New Products, http://www.poslight.com/News/Newproducts/Newprod.htm, Sep. 21, 2000, pp. 1–2.

Robert R. Drchnavek et al., Laser direct writing of channel waveguides using spin–on polymers, J. Appl. Phys. 66 (11), Dec. 1, 1989, pp. 5156–5160.

Maxim S. Pshenichnikov et al., Generation of 13–fs, 5–MW pulses from a cavity–dumped Ti:sapphire laser, Optics Letters, vol. 19, No. 8, Apr. 15, 1994, pp. 572–574.

Wataru Watanabe et al., Optical Seizing and Merging of Voids in Silica Glass With Infrared Femtosecond Laser Pulses, Optics Letters, vol. 25, No. 22, Nov. 15, 2000, pp. 1669–1671.

Alexander M. Streltsov et al., Fabrication and analysis of a directional coupler written in glass by nanojoule femtosecond laser pulses, Optics Letters/vol. 26, No. 1/Jan. 1, 2001.

* cited by examiner

LASER-WRITTEN CLADDING FOR WAVEGUIDE FORMATIONS IN GLASS

TECHNICAL FIELD

Embedded waveguides can be written by focusing high-energy pulses inside glass. Wavelengths of the pulses are beyond the normal absorption edge of the glass so that the pulses can transmit through the glass without appreciably altering the glass structure until a threshold power density is reached. Refractive index changes induced at the threshold power densities contrast with unaltered portions of the glass to provide light-guiding properties.

BACKGROUND

The writing of optical waveguides (i.e., light-guiding or light-managing structures) embedded within glass is accomplished by focusing high energy pulses within the glass and relatively translating the pulses with respect to the glass. The high-energy pulses have wavelengths beyond the absorption edge (optical density of unity) of the glass, but are focused to power densities within the glass at which the glass undergoes a change in refractive index. Thus, the pulses can penetrate the glass without dispersing their energy or damaging the glass, but can be focused to threshold power densities at which localized portions of the glass undergoes a transformation that changes the local refractive index of the glass.

The pulses are delivered in beams that are focused to near the diffraction limit to concentrate pulse energies within limited spot sizes. The resulting refractive index changes are centered at the spot focus of the beams. The spot focus can be relatively translated to produce modified-index tracks through bulk glasses. Index increases in the range of $1 \times 10^{-3}$ to $5 \times 10^{-3}$ have been found sufficient to support waveguiding properties along the tracks, which function as the cores of waveguides.

Two writing regimes have emerged for writing within different types of glass materials. One, which relies on amplified femtosecond pulse sources, operates at pulse energies in the microjoule ($\mu$J) range and at repetition rates in the kilohertz (kHz) range. Another, which relies on femtosecond laser oscillators, operates at pulse energies in the nanojoule (nJ) range and at repetition rates in the megahertz (MHz) range. In both regimes, non-linear absorption mechanisms are believed responsible for producing localized increases in refractive index.

Of the two regimes, cores can be written most effectively in silica-based glasses using amplified femtosecond pulse sources. Femtosecond laser oscillators can write waveguides more effectively in materials such as borosilicate, sulfide, and lead glasses. However, in both instances, the desired localized increases in refractive index tend to be self-limiting in the range of a multiple of $10^{-3}$.

The spot focuses of the femtosecond lasers generally produce small diameter cores of around 2 microns ($\mu$m) to 3 microns ($\mu$m). Given the index change on the order of $10^{-3}$, the waveguiding properties of the small diameter waveguides are relatively weak. Where, as here, both the index difference and the waveguide diameter are comparatively small, a substantial portion of the signal is carried in the surrounding medium (e.g., a cladding) of the waveguide. Signal losses are larger for signals that significantly encroach upon the surrounding medium. Bending losses associated with such weak waveguiding properties limit the minimum radius of curvature through which the waveguides can be bent during use.

Co-assigned U.S. patent application Ser. No. 09/997,751 entitled Manipulating the Size of Waveguides Written into Substrates using Femtosecond Pulses, which is hereby incorporated by reference, describes additional motions for enlarging the core areas of waveguides to improve light-guiding efficiency. However, other consequences of enlarged diameters include different requirements for coupling to the waveguides and transmission of additional modes.

SUMMARY OF INVENTION

Our invention in one or more preferred embodiments provides for directly writing embedded waveguides with improved contrast between core and cladding portions by using high-energy pulses to produce contrasting index cladding. Pulse energies beyond the range at which non-linear absorption mechanisms produce slight increases in refractive index are used in accordance with our invention to reverse the index effect and produce more significant decreases in refractive index. Such refractive index decreases are patterned within the interiors of optical media to produce the cladding of waveguides. Although associated with possible structural changes, such as the formation of voids, the significantly reduced cladding index supports strong light-guiding properties along remaining unmodified cores.

Producing waveguides within the interior of an optical medium by writing a surrounding cladding portion of the embedded waveguides has several advantages over writing a core portion of the embedded waveguides. Unlike writing regimes focused on the core, corresponding writing regimes focused on the cladding do not subject the core to changes that could significantly reduce the core's ability to transmit light efficiently. In addition, much more significant index contrasts between the core and cladding are made possible by using high-energy pulses to lower the index of the cladding. The remaining core can be sized in diameter and shaped as desired for conveying and orienting signals and can be tapered as a function of length as desired for coupling or other purposes.

Our preferred method for writing embedded waveguides in an optical medium includes producing a beam of light composed of a train of pulses having a width less than 200 femtoseconds and having a wavelength beyond an absorption edge (optical density of unity) of the optical medium. The beam is focused within an interior of the optical medium at a power density sufficient to produce a local reduction in a refractive index of optical medium where the beam is focused. The optical medium is relatively moved with respect to the focused beam so as to trace a cladding pattern in the optical medium having a refractive index reduced with respect to a core circumscribed by the cladding pattern for producing a waveguide embedded in the optical medium.

The relative motion between the optical medium and the focused beam preferably traces a helical pattern in the optical medium. A component of the relative motion along an axis of the helical pattern is aligned with a length of the embedded waveguide. The axis is inclined to produce bends in the embedded waveguide. Ordinarily, the transverse shape of the circumscribed core is circular, but other shapes such as oval can also be traced. The transverse dimensions of the embedded waveguide are also generally constant along a length of the embedded waveguide, but variations in the transverse dimensions can be made by varying the trace of the cladding as a function of the relative movement along the length of the core.

The beam is preferably focused at a power density sufficient to produce a local reduction in a refractive index of the optical medium by at least $1\times10^{-2}$. The local reduction in refractive index of the optical medium can be produced by a process of chemical deformation and rearrangement, such as by creating voids in the medium. Pulse energies of the beam preferably range from 0.1 microjoules ($\mu$J) to 20 microjoules ($\mu$J).

The beam is preferably focused to a spot size for producing a local reduction in the refractive index of optical medium over an area that is wider than wavelengths of light intended to be guided along the embedded waveguide. For example, the beam can be focused to a spot size having an average diameter of 3 microns to 5 microns.

An exemplary optical waveguide in accordance with our invention is embedded within an interior of an optical medium exhibiting an underlying refractive index. A core portion of the embedded waveguide has a refractive index substantially equal to the underlying refractive index of the optical medium. However, a cladding portion of the embedded waveguide surrounding the core portion has a refractive index that is substantially reduced with respect to the underlying refractive index of optical medium. Both the core portion and the surrounding cladding portion of the embedded waveguide extend a common length within the interior of the optical medium at a distance from an exterior surface of the optical medium.

Preferably, the optical medium has a substantially uniform refractive index. For example, the optical medium can be made of a homogeneous material such as glass. The core portion has a refractive index that is substantially equal to the uniform refractive index of the optical medium, and the cladding portion has a refractive index that is substantially reduced with respect to the uniform refractive index of the optical medium. A portion of the optical medium surrounding and adjacent to the cladding portion has a refractive index substantially equal to the uniform refractive index of the optical medium.

The cladding portion of the embedded waveguide preferably has a reduced density with respect to the density of the optical medium. For example, the cladding portion can include voids that reduce the refractive index of the cladding portion with respect to the underlying refractive index of the optical medium. The refractive index of the cladding portion is preferably reduced with respect to the underlying index of the optical medium by at least $1\times10^{-2}$.

The cladding portion is formed as a helical trace surrounding the core portion in the optical medium. A transverse shape of the core portion circumscribed by the cladding portion is preferably a circle but can also depart from a circle for purposes such as polarization control. Similarly, a transverse size of the core portion circumscribed by the cladding portion is preferably held constant along a length of the waveguide but can also be varied as a function of the waveguide length for purposes such as coupling.

DRAWINGS

DETAILED DESCRIPTION

Figure 1:
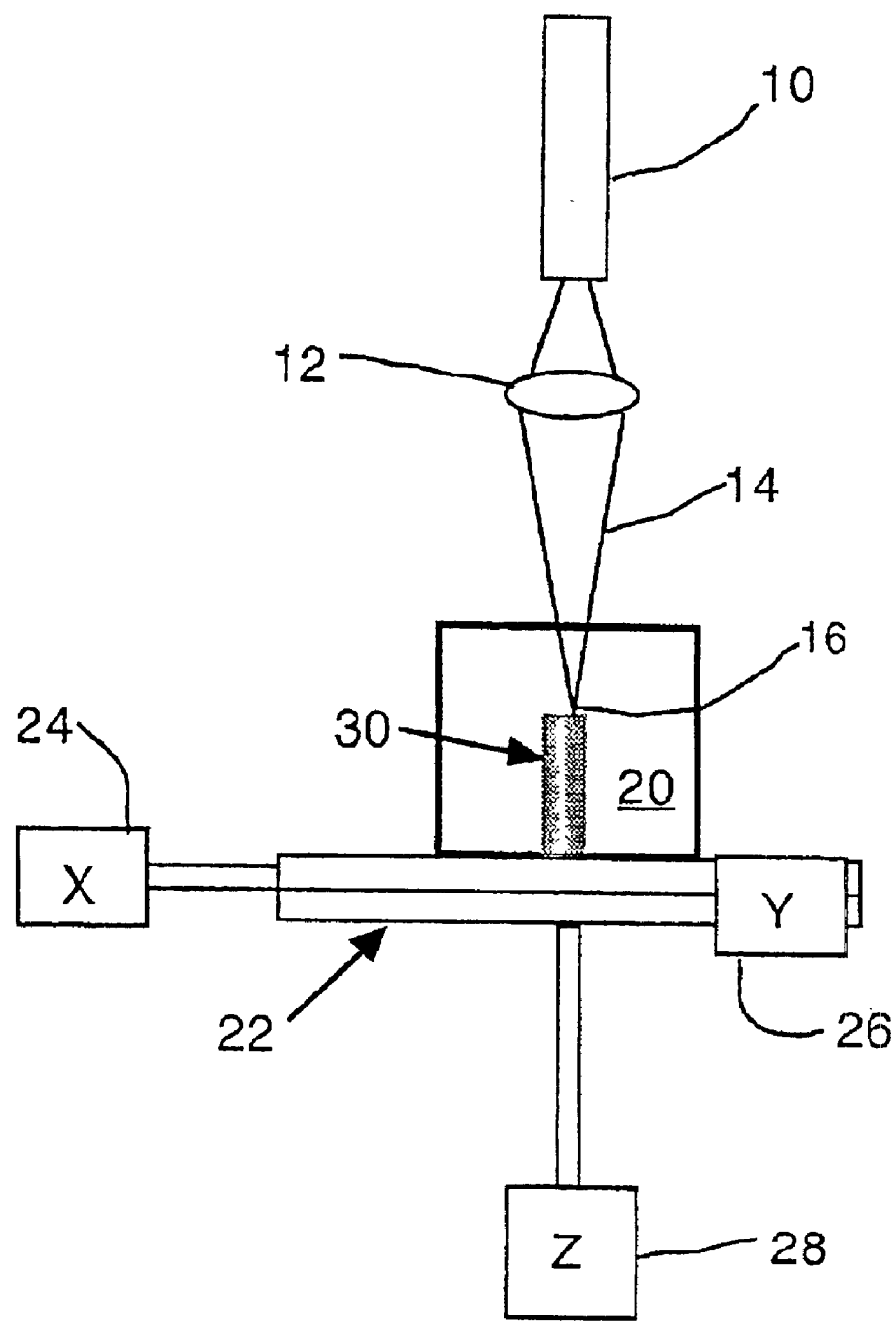
FIG. 1 is a diagram showing an exemplary system for writing waveguides in bulk glasses using femtosecond pulsed lasers. The bulk glass is mounted on a motorized stage to control both longitudinal and transverse dimensions of the waveguides.

An exemplary writing system depicted in FIG. 1 includes a femtosecond laser 10, such as a Ti:Sapphire multi-pass amplifier. Laser performance characteristics such as laser wavelength, pulse width, pulse energy, and repetition rate can be collectively optimized for different optical materials. Stability and other overall performance characteristics of the lasers can also be considered for improving accuracy and efficiency of the writing process.

A beam 14 output from the laser 10 is focused by conventional focusing optics 12 to a spot 16 within an optical medium 20 such as bulk glass. Preferably, the beam 14 is focused to a spot size (e.g., 3 microns to 5 microns) near the diffraction limit to concentrate pulse energies (e.g., 0.1 microjoules to 20 microjoules). Numerical apertures above 0.2 are generally preferred to limit a depth of focus at which the beam 14 is effective for producing a localized change in the refractive index. However, a tradeoff is involved. Increases in numerical aperture also have the effect of decreasing working distance, which can limit the depth at which a waveguide 30 can be written into the optical medium 20.

The exposure wavelength should be greater than the absorption edge of the optical medium 20 to support uninhibited transmissions of the beam 14 into the interior of the optical medium 20. However, the exposure wavelength is preferably within a multiple of two times the absorption edge to limit the amount of energy needed to induce a refractive index increase in the optical medium 20. Beyond the absorption edge, the absorption coefficient tends to decrease exponentially with wavelength.

Pulse duration (width) should be as short as possible to achieve the highest intensities with the least amount of pulse energy. The femtosecond pulses are preferably less than 200 femtoseconds in duration, but pulses as short as 20 femtoseconds are favored to achieve the desired intensity with limited pulse energy. Pulses much below 20 femtoseconds are known to disperse through both air and glass. Pulse widths within a 20 femtosecond to 50 femtosecond range are considered practical for most applications.

A threshold intensity (i.e., power density) is required to induce the desired reduction in refractive index. At lesser intensities, small increases in refractive index have been observed, but more power reverses this trend producing more precipitous drops in refractive index. The index reductions are much less limited than the typical increases in refractive index brought about at lower intensities, because underlying material damage must be avoided to sustain the index increases but the index decreases can accompany chemical deformation and rearrangement of the optical medium. The rearrangements can include the formation of voids, whose presence reduces an average refractive index of local volumes containing the voids. Such material damage, while deleterious to a core portion of a waveguide, can be tolerated in a cladding portion of a waveguide without unduly limiting transmission efficiency. Subsequent annealing operations can be performed on the bulk glass to reduce incidence of light scattering from the cladding.

Figure 2:
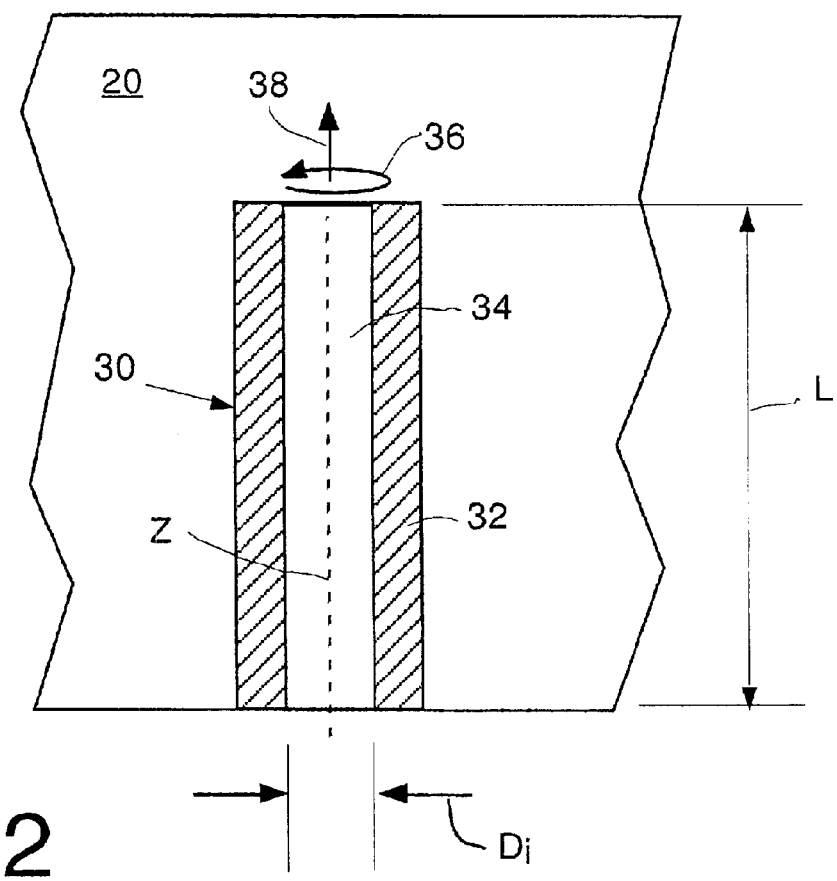
FIG. 2 is an enlarged side view of an embedded waveguide formed by writing the cladding portion of the waveguide in bulk glass.
Figure 3:
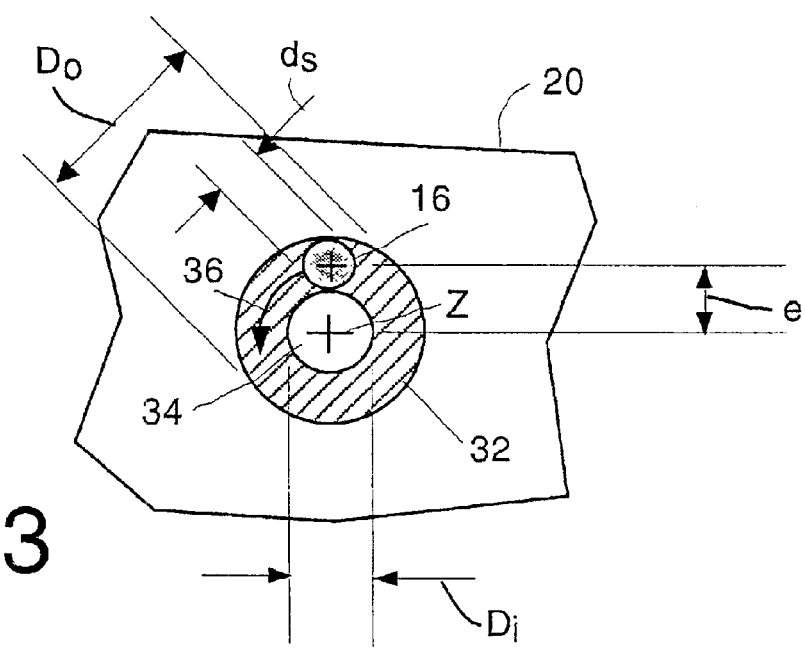
FIG. 3 is an enlarged end view of the same embedded waveguide showing additional dimensions related to its formation.

The spot focus 16 within the optical medium 20 at which the laser beam 14 is focused is relatively translated with respect to the optical medium 20 to write a cladding portion 32 circumscribing a remaining core portion 34 of the desired waveguide 30 as shown more clearly in FIGS. 2 and 3. The relative motion traces a path of exposure that extends the localized reduction in the underling refractive index through the optical medium 20 in a shape that circumscribes a path that is not similarly exposed by the laser beam 14. The path of exposure forms the cladding portion 32 of the waveguide 30, and the circumscribed path forms the core portion 34 of the waveguide 30.

The relative motion can be produced by moving either the spot focus 16 or the optical medium 20 or by moving both the spot focus 16 and the optical medium 20. In the arrangement depicted in FIG. 1, the optical medium 20 is mounted on an XYZ coordinate motion table 22. Separate computer controlled drives 24, 26, and 28 provide for imparting translational motions to the optical medium 20 in three orthogonal directions. The coordinated motions preferably maintain an entry surface of the optical medium 20 normal to the incident beam 14.

The combined translational motions along the three coordinate axes (X, Y, and Z) can trace any desired curvilinear path of the spot focus 16 through the optical medium 20. For producing the cladding portion 32, the overall curvilinear path of the spot focus 16 is preferably a helical path. The drives 24 and 26 impart a continuous circular motion in the X-Y plane as represented by the arrow 36, and the drive 28 imparts a simultaneous linear motion along the Z axis as represented by the arrow 38.

In the embodiment depicted by the first three figures, the core 34 of the waveguide 30 has a length "L" corresponding to the amount of translation along the Z axis and a transverse diameter "$D_i$" corresponding to twice an eccentric offset "e" of the spot focus 16 minus a diameter "$d_s$" of the spot focus 16. The cladding 32 has a transverse diameter "$D_o$" corresponding to twice the eccentric offset "e" of the spot focus 16 plus the diameter "$d_s$" of the spot focus 16. With the same size spot focus 16, the core diameter "$D_i$" can be reduced or enlarged by changing the eccentric offset "e" of the helical path. However, the diameter "$d_s$" of the spot focus 16 is preferably sized for producing localized reductions in refractive index over an area that is wider than the wavelengths of light intended to be guided along the embedded waveguide 30.

Additional components of translation in the X-Y plane can be coordinated with the translation along the Z axis to produce curvilinear-shaped waveguides (e.g., motions that effectively incline the axis of helical motion). The orientation of the beam 14 with respect to the optical medium 20 can also be changed to support additional curvature or other directions of the waveguides.

Figure 4:
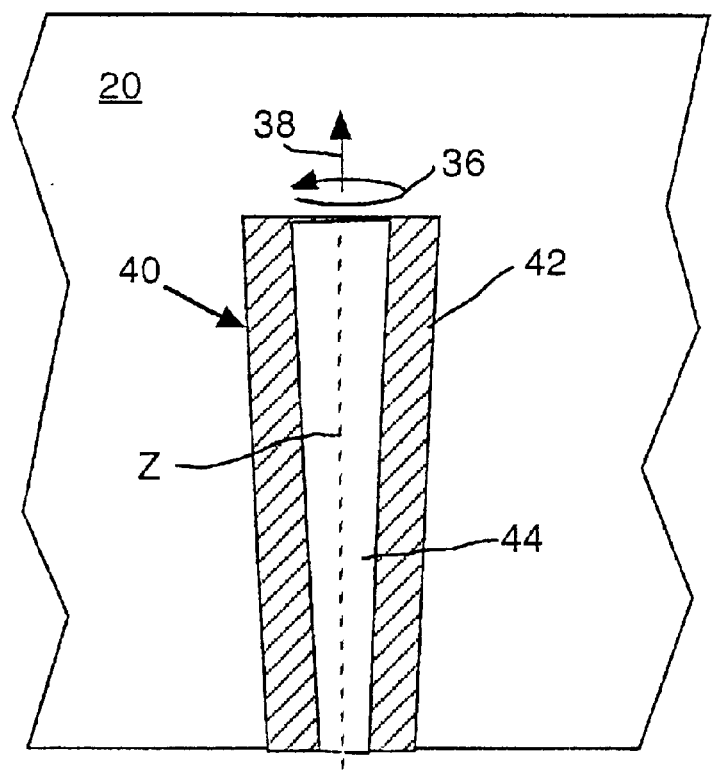
FIG. 4 is an enlarged side view of an alternative embedded waveguide that tapers in diameter along its length by progressively varying the writing pattern of the cladding portion of the waveguide.
Figure 5:
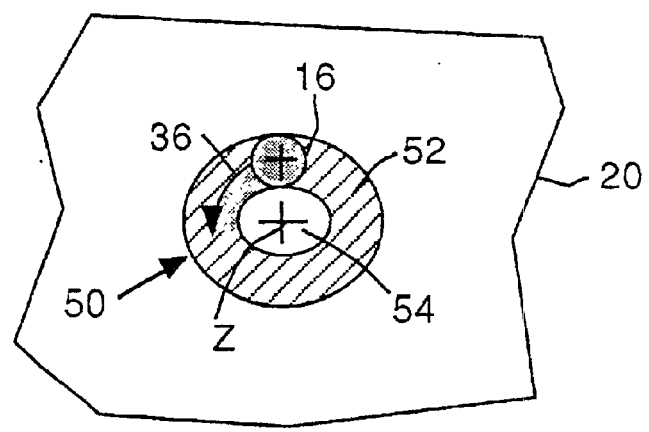
FIG. 5 is an enlarged end view of an alternative embedded waveguide having an oblong transverse shape formed by cyclically varying the writing pattern of the cladding portion of the waveguide.

FIGS. 4 and 5 depict alternative embodiments in which additional motion components vary dimensions of waveguides 40 and 50. In FIG. 4, an additional component of motion varies the eccentric offset "e" (shown in FIG. 3) as a function of the length "L" of the waveguide 40 to produce a tapering cladding portion 42 along with a correspondingly tapering core portion 44. Such tapers can be used for coupling or other light-management purposes. In FIG. 5, an additional component of motion varies the eccentric offset "e" as a function of polar angle position of the spot focus 16 around the Z axis to produce an oval-shaped cladding portion 52 along with a correspondingly oval-shaped core portion 54 of the waveguide 50. This and other variations in the core shape can be used for such purposes as polarization control.

Although the cladding portions 32, 42, and 52 of the exemplary waveguides 30, 40, and 50 are depicted as being exactly traced by the spot focus 16, the accompanying reduction in refractive index can spread beyond the spot focus 16 in accordance with the pulse energies that are concentrated in the optical medium 20. The eccentric offset "e" of the relative motion between the laser beam 14 and the optical medium 20 can be enlarged to accommodate larger areas of index reduction to produce the desired diameter core portions 34, 44, and 54.

EXAMPLE 1

A Ti:Sapphire multi-pass amplifier laser emits a 20 kilohertz (kHz) train of 40 femtosecond (fs) pulses at a wavelength of 800 nanometers (nm). The pulses, which have a pulse energy of 15 microjoules ($\mu$J), are focused to near the diffraction limit through a 0.28 numerical aperture (NA) objective into a 1.0 centimeter (cm) thick amorphous optical medium of high-purity fused silica. The laser beam and the optical medium are relatively moved along a helical pathway at an eccentric offset of 20 microns ($\mu$m), at a thread step of 5 microns ($\mu$m), and at a writing speed of 17 microns per second ($\mu$m/s). The exposed volumes of the fused silica are expected to contain a network of microvoids. To reduce scattering from the network of microvoids, the fused silica is annealed at 900 degrees centigrade (° C.) for two hours.

EXAMPLE 2

A similar amplifier laser is used to write a waveguide in an alternative single-crystal optical medium made of calcium fluoride ($CaF_2$). The wavelength, pulse width, and repetition rate of the laser are the same as in Example 1, but the pulse energy is much lower. The focusing is provided by a 10×0.26 numerical aperture (NA) objective. Helical tracks are written along one of the crystal axes at an eccentric offset of 8 microns ($\mu$m), a thread step of 3 microns ($\mu$m), and a writing speed of 100 microns per second ($\mu$m/s). A distinctive cladding portion circumscribing a remaining core portion is obtained at pulse energies of 0.5 microjoules ($\mu$J).

At higher pulse energies (e.g., 20 $\mu$J), control over the index profile of the waveguides is expected to be reduced. However, at somewhat lower pulse energies (e.g., 0.3 $\mu$J), reductions in refractive index are still expected to be writeable into the calcium fluoride ($CaF_2$). Below such an exposure threshold, the refractive index of the exposed medium remains unchanged or can actually increase. The reduction in the refractive index of the cladding portion at pulse energies of 0.5 $\mu$J is expected to exceed $1 \times 10^{-2}$.

Figure 6:
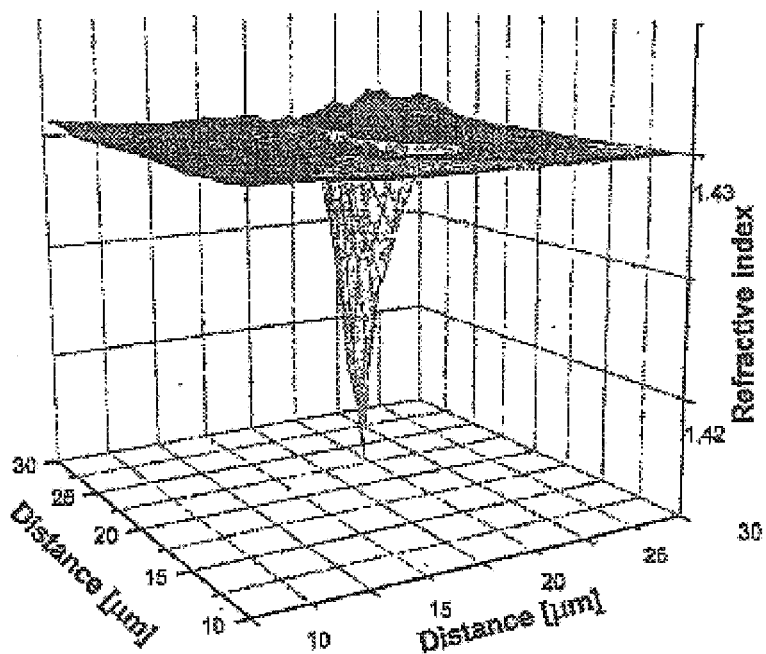
FIG. 6 is a three-dimensional graph of refractive index variations in a calcium fluoride crystal showing an index reduction over two dimensions of the crystal.

FIG. 6 graphs a localized decrease in refractive index of a calcium fluoride ($CaF_2$) medium produced along a linear track by a similar laser configuration at a writing speed of 20 microns per second ($\mu$m/s). The illustrated reduction in refractive index of approximately 0.012 is measured with respect to an underlying refractive index of approximately 1.43 of the calcium fluoride medium.

Figure 7:
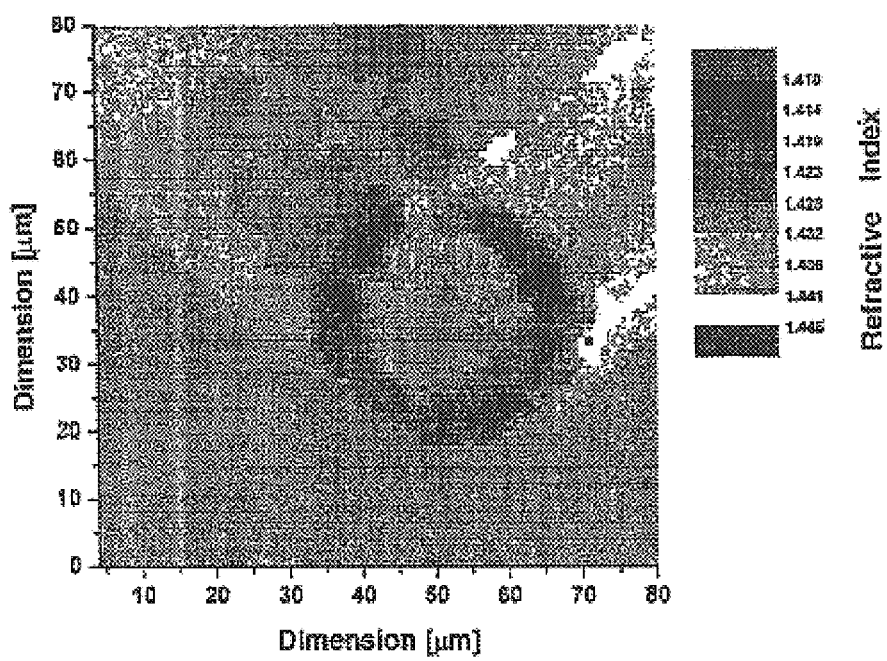
FIG. 7 is a gray-scaled graph of refractive index variations in the calcium fluoride crystal showing a helically traced index reduction for forming a cladding surrounding a substantially unmodified core.

FIG. 7 graphs areas of reduced refractive index in the calcium fluoride medium produced along a helical track by a similar laser configuration at a writing speed of 100 microns per second (μm/s) and at an eccentric offset of 8 microns (μm). The darker shaded regions depict areas of reduced refractive index, which form a cladding portion of a waveguide surrounding a substantially unmodified core portion of the same waveguide.

Although the spot focuses of the preceding examples circumscribe core portions by tracing helical pathways, the laser beam could also be alternatively focused to an annulus for simplifying the relative motion required to write waveguides. The core portions of the examples remain substantially unexposed to exploit the inherent transmissive properties of the optical medium. However, the core portions could also be exposed, such as at power densities known to increase refractive index, to further control index profiles of waveguides. The embedded waveguides of the preceding examples extend through the interiors of the optical media at distances from exterior surfaces of the optical media. However, similar cladding structures can also be formed along the exterior surfaces of the optical media.

In addition to the fused silica and calcium fluoride materials referred to in the above examples, many other transmissive optical mediums can be written with index-modified claddings including the various oxide glasses such as soda lime and borosilicates. For most applications, the optical medium is expected to be a homogeneous material in which unexposed portions of the material exhibit a uniform refractive index. However, index variations can be incorporated into the optical medium and overwritten by the cladding portions to provide additional light-managing capabilities.

We claim:

1. An optical waveguide embedded within an interior of an optical medium comprising:

the optical medium exhibiting an underlying refractive index;

a core portion of the embedded waveguide having a refractive index substantially equal to the underlying refractive index of the optical medium;

a cladding portion of the embedded waveguide surrounding the core portion and having a refractive index substantially reduced with respect to the underlying refractive index of the optical medium, and both the core portion and the surrounding cladding portion of the embedded waveguide extending a common length within the interior of the optical medium at a distance from an exterior surface of the optical medium.

2. The waveguide of claim 1 in which the optical medium exhibits a uniform refractive index.

3. The waveguide of claim 2 in which the optical medium is made of a homogeneous material.

4. The waveguide of claim 2 in which the core portion has a refractive index substantially equal to the uniform refractive index of the optical medium.

5. The waveguide of claim 4 in which the cladding portion has a refractive index substantially reduced with respect to the uniform refractive index of the optical medium.

6. The waveguide of claim 5 in which the cladding portion is surrounded by a portion of the optical medium having a refractive index substantially equal to the uniform refractive index of the optical medium.

7. The waveguide of claim 1 in which the cladding portion of the embedded waveguide has a reduced density with respect to an underlying density of the optical medium.

8. The waveguide of claim 7 in which the cladding portion includes voids that reduce the refractive index of the cladding portion with respect to the underlying refractive index of the optical medium.

9. The waveguide of claim 7 in which the refractive index of the cladding portion is reduced with respect to the underlying index of the optical medium by at least $1 \times 10^{-2}$.

10. The waveguide of claim 1 in which the cladding portion is formed as a helical trace surrounding the core portion in the optical medium.

11. The waveguide of claim 1 in which a transverse shape of the core portion circumscribed by the cladding portion departs from a circle.

12. The waveguide of claim 1 in which a transverse size of the core portion circumscribed by the cladding portion is varied as a function of a length of the embedded waveguide.

* * * * *